United States Patent [19]

Firman

[11] 3,818,134

[45] June 18, 1974

[54] APPARATUS FOR CONVERTING TELETYPEWRITER SIGNALS FOR USE IN DIGITAL LOGIC CIRCUITS

[75] Inventor: Carl M. Firman, San Diego, Calif.

[73] Assignee: The United States of America as represented by the Secretary of the Navy, Washington, D.C.

[22] Filed: Jan. 2, 1973

[21] Appl. No.: 320,240

[52] U.S. Cl. .......................... 178/26 R, 178/53.1 R
[51] Int. Cl. .............................................. H04l 3/00
[58] Field of Search.... 178/69 R, 69 A, 26 R, 26 A, 178/53.1 R; 340/347 DD

[56] References Cited

UNITED STATES PATENTS 3,404,233 10/1968 Mason et al. .................. 178/53.1 R

*Primary Examiner*—Thomas A. Robinson
*Attorney, Agent, or Firm*—R. S. Sciascia; G. J. Rubens; J. W. McLaren

[57] ABSTRACT

Teletypewriter signals including a start signal, data information defined by signal transitions occurring within a predetermined number of repetitive uniform data periods, and a stop signal are operated upon so that they are converted to signals adapted for use in digital logic circuits in a unique manner which avoids electromagnetic interference of both the radiated and conducted types. The start signal is used for producing a delayed enabling signal after the occurrence of the signal transition point of the first of the uniform data periods and a clock, responsive to the enabling signal, produces sampling pulses at the same rate as the repetition rate of the uniform data periods. The sampling pulses sample the incoming data information within each data period and produce commensurate output data information in the form of pulses usually of low voltage type for use in digital logic circuits. A counter responsive to the same enabling circuit sequentially counts the number of sampling pulses and produces an output signal indicative of a cummulative count equal to the predetermined number of repetitive uniform data periods and the output signal is employed to reset both the clock and the counter means. As a result, all the signals adapted for use in digital logic circuits are produced and generated at times other than during the occurence of signal transitions of the incoming teletypewriter signal thus eliminating the generation of false signals as well as the effects of unwanted electromagnetic interference of both the radiated and conducted types.

4 Claims, 2 Drawing Figures

APPARATUS FOR CONVERTING TELETYPEWRITER SIGNALS FOR USE IN DIGITAL LOGIC CIRCUITS

BACKGROUND OF THE INVENTION

As is well known, the teletypewriter machine is a device which has a keyboard similar to the typewriter and incorporates typewriter capabilities of printing letters on a page of paper commensurate with keys depressed on its keyboard. The additional capability of the teletypewriter machine is that it is designed to communicate messages to one or more other teletypewriter machines which similarly have typewriting capabilities but are at remote locations. Thus, a single teletypewriter machine operation in its transmit mode may send messages to several like teletypewriter machines at remote locations.

The teletypewriter machine communicates with its remote counterparts by transmitting coded data representative of alphabetical letters, numerals, and symbols. Conventionally, the data sent by one teletypewriter machine to another is in serial form; that is to say, that one data bit follows after another. In most conventional teletypewriter systems five, six, seven, or eight data bits may be used. These data bits convey the message from the transmitting teletypewriter machine to the receiving teletypewriter machines that a particular key has been actuated on the keyboard of the teletypewriter machine originating the message.

In addition to the data bits, the transmitting teletypewriter machine also produces a "start" and a "stop" pulse. Such start and stop pulses are necessary to put the receiving teletypewriter machines in operative condition to receive messages as contained in data bits and then to terminate such operative condition when the received message has been completed since such teletypewriter systems are rarely if ever in completely continuous usage but most frequently are operative on an intermittent basis. The data bits in a typical teletypewriter system may be arranged in what is known as the Baudot code.

Frequently teletypewriter equipments are interfaced with data processing or data computation units and supply a portion of the inputs to digital logic circuits associated with such data units.

Teletypewriter machine systems customarily operate at relatively high voltages to drive the remote, receiving teletypewriter machines and, when transmitting data bits, such potentials may involve signal transitions from positive potentials of the order of +100–150 volts dc to negative potentials of the order of −100–150 volts dc.

A suitable conversion means is required to interface the higher potential teletypewriter signals with logic circuits which may operate at much lower potentials of the order of approximately 5 volts, for example. A prime function of such converter apparatus is to extract the data information from the relatively high potential teletypewriter signals and reproduce commensurate data information reliably and accurately in the form of lower potential signals adapted for use in digital logic circuits.

However, the teletypewriter signal transitions from +100–150 volts dc to −100–150 volts dc and vice versa can and do generate a considerable amount of electromagnetic interference. The undesirable electromagnetic interference thus generated usually occurs in two principal forms. Firstly, there is radiated interference which is transmitted much the same as radio signals and, secondly, there is conducted interference; that is to say, that type of interference which is conducted along ground connections and other connecting conductors which may be common to other equipments conductively connected in the system or subsystem.

Unfortunately, when such electromagnetic interference becomes strong enough, it can cause digital logic circuits to respond to false signals, create errors, and related unwanted difficulties. Moreover, the radiated type of interference may be picked up by interconnecting wires and conductors in related subsystems or integrated circuits while the conducted interference may be transmitted along power supply leads, ground leads, and similar connections to these same subsystems and integrated circuits.

The unwanted interference produced by conventional teletypewriter machines occurs almost entirely when the signal the teletypewriter machine is generating is in a changing state. For example, a teletypewriter machine generates unwanted interference when its output changes from a stop pulse to a start pulse because of the relatively large signal transition which occurs upon a change from positive potentials of the order of +100–150 volts dc to negative potentials of −100–150 volts dc, and vice versa. If digital logic circuitry is in an operational condition to be responsive to such interference, false error signals may be generated. In the prior art relatively elaborate, expensive, and somewhat cumbersome preventive measures were taken to minimize the unwanted effects of electromagnetic interference.

For example, it was customary and usual for prior art converters to employ extensive shielding, electrical filters, with complex bonding and grounding techniques to attenuate and minimize the effects of unwanted electromagnetic interference resulting from both the radiated type of interference as well as the conducted type of interference. Notwithstanding such precautions, it was still possible for unwanted and undesired interference to cause false error signals where a teletypewriter machine was operated in connection with or close to typical digital logic circuitry.

Accordingly, there is a need for a converter which will operate to transfer teletypewriter machine data bits to a suitable form adapted to use in data logic circuitry and to complete such signal conversion while minimizing the possible effects of unwanted and undesirable electromagnetic interference generated by the operation of a typical teletypewriter machine.

SUMMARY OF THE INVENTION

The typical teletypewriter machine produces unwanted electromagnetic interference when it changes from one potential to another in order to generate the start or end of a pulse which contains data information. Such a signal transition may involve a change from a positive potential of +100–150 volt dc to a negative potential of −100–150 volt dc or vice versa. Further, the typical teletypewriter machine will usually remain in a high potential or low potential condition for several milliseconds in order to generate the pulse which is representative of a data bit. Since virtually all the unwanted electromagnetic interference occurs as a result of the maximum signal transition from one extreme potential to the opposite extreme potential, relatively little electromagnetic interference occurs during the period when a pulse is being maintained at a relatively level potential. Therefore, during a period of time when the teletypewriter machine is between the operation of starting or stopping a pulse, relatively little electromagnetic interference is generated.

The present invention conceives a combination of apparatus which is operative to generate signals which are adapted for use in digital logic circuits and are also commensurate with incoming teletypewriter signals but are nonetheless not susceptible to electromagnetic interference generated by typical teletypewriter data bit signals. This is accomplished by having the operation of the teletypewriter to digital logic converter so coordinated that digital logic type signals are only generated during those periods of time when the teletypewriter signals are not undergoing a significant signal transition which transitions are, as was previously mentioned, usually and almost wholly of an abrupt change as in a square wave from one potential extreme to another.

Typically, the teletypewriter signals generated by a transmitting teletypewriter machine and received by a like machine at a remote location will consist firstly of a start signal, then data information as contained in substantially square wave type of pulses representing a binary code, and finally a stop signal. The pulses, which represent the data information, are defined by signal transitions which occur within a predetermined number of repetitive uniform data periods, such as the five, six, seven, or eight data bits systems which were mentioned previously as being typically representative of teletypewriter machine operation.

The present invention conceives a means which is responsive to the start signal for producing a delayed enabling signal after the occurrence of the signal transition point of the first of the uniform data periods containing the coded binary data. A clock is responsive to an enabling signal for producing sampling pulses at the same rate as the repetition rate of the uniform data periods. A suitable means is arranged to be responsive to the sampling pulses for sampling the data information within each of the data periods and producing commensurate data information in the form of pulses suited for use in digital logic circuits. Such pulses may be of the order of five volts above ground potential as contrasted to the typical 200–300 volt transition of teletypewriter signals; additionally, the digital logic type of signals are customarily of a relatively very short pulse duration as compared to the teletypewriter signals.

Counter means, which is responsive to the same enabling signal received by the clock, is operative for sequentially counting the number of sampling pulses and producing an output signal indicative of a cumulative count of pulses equal to the predetermined number of repetitive uniform data periods in the received teletypewriter signal. Completing the system is an appropriate means which is responsive to the output signal from the counter for resetting both the clock and the counter means.

Thus, the combination of apparatus as conceived and taught by the present invention is repetitively operative to set a clock in operation for generating sampling pulses which are delayed or out of phase relative to the signal transition points of the teletypewriter signals and therefore the conversion to digital logic type signals can only be accomplished at times when the teletypewriter signal is not in a condition of signal transition. Accordingly, the major problem of undesired and unwanted electromagnetic interference effects is virtually entirely eliminated.

Moreover, in accordance with the concept of the present invention, the clock which is employed need not be highly accurate as to its constancy of frequency because each time a new teletypewriter signal is received which is representative of a particular alphanumeric or symbol, the clock is restarted and as a result does not accumulate errors in frequency over a long period of time.

Accordingly, it is a primary object of the present invention to provide an improved apparatus for converting teletypewriter signals into signals adapted for use in digital logic circuits which obviates the unwanted and undesirable electromagnetic interference effects of the teletypewriter signals upon associated digital logic circuits and digital logic signals.

It is an equally important object of the present invention to accomplish the elimination of the undesirable effects of such interference without the use of extensive shielding, filtering, bonding, grounding, and other similar techniques as were employed by the prior art.

Yet another object of the present invention is to provide such a converter which employs simplified circuitry including a clock of minimal frequency accuracy requisites.

Yet a further important object of the present invention is to facilitate the employment of such a clock in a teletypewriter signal converter by minimizing the accumulation of drift in the frequency of the clock signals.

A more specific object of the present invention is the minimizing of unwanted interference from teletypewriter generated signal transitions by permitting the generation of digital logic signals only during the absence of such teletypewriter signal transitions.

A further object of the present invention is the transformation of teletypewriter signal data information into a form adapted to use in digital logic circuits with the added provision of synchronizing signals for controlling the operation of associated equipments.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
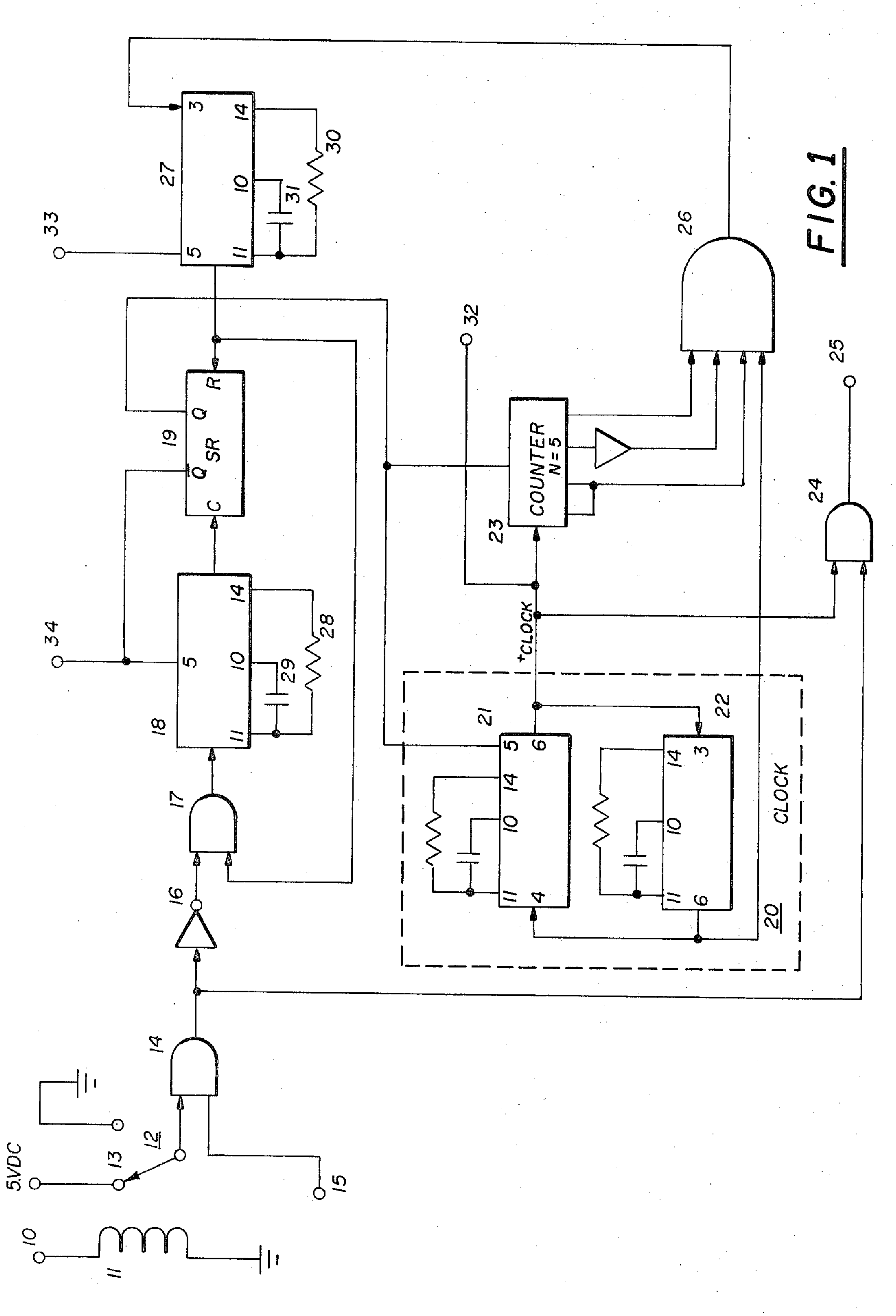
FIG. 1 is a schematic block diagram of a preferred embodiment of the present invention.

As is shown in FIG. 1, a typical teletypewriter signal may be received at input terminal 10 which is connected in series with the coil 11 of a relay 12. The contact points of the relay arm 13 are connectable in one condition with a ground potential and in the alternate condition with a suitable low voltage of the order of 5 volts dc.

The signal developed by the relay contact arm 13 is connected as one of two inputs to a NAND gate 14; the other input to the NAND gate 14 is received from a stop input control terminal 15. The output of the NAND gate 14 is connected to a digital inverter 16 which in turn provides its output as one of two inputs to a NAND gate 17. The output of NAND gate 17 is connected as an input to a monostable multivibrator 18 which may take the form of an integrated circuit chip. The output of the monostable multivibrator 18 is connected as an input to a SR flip-flop 19 which is operative to provide alternate outputs, one of which is connected to a clock 20 shown within the dash line rectangular enclosure.

The clock 20 comprises two mutually interconnected monostable multivibrator circuits 21 and 22 which may also take the form of integrated circuit chips. The clock 20 provides square wave type pulse outputs that are connected to the counter 23 which may be of the decade counter type. The clock 20 also provides its pulse outputs for use as clock sampling pulses in a NAND gate 24. The NAND gate 24 receives its second input from the NAND gate 14 and develops the ultimate output signals of the converter apparatus at an output terminal 25. The counter 23 has its outputs connected to a NAND gate 26 which in turn provides the input to a monostable multivibrator 27.

OPERATION

A preferred embodiment of the present invention, shown in FIG. 1, receives typical teletypewriter high voltage signals at input terminal 10 which signal flows through the coil 11 of the relay 12 to ground and in so doing causes the actuation of the relay contact point 13. When the signal received is at its highest potential, the relay contacts 13 are caused to be connected to a 5 volt dc source of electrical energy thus developing a typical input signal to the NAND gate 14 at a level of approximately 5 volts dc. When, however, the input signal received at terminal 10 is of a low or negative potential, the contact points 13 of relay 12 are alternatively connected to ground so that the 5 volt dc potential signal which previously had been connected as an input to NAND gate 14 has a sharp signal transition to a ground potential. The result is that the rectangular or square wave type of signals which are typical of teletypewriter coded digital data in the form of relatively large potential transition signals, of the order of 200 to 300 volt maximum transitions are converted to like digital data information represented by signal transitions of only approximately 5 volts dc to ground, as an example.

The second input to the NAND gate 14 is realized from a stop input terminal 15. This input is normally at a high or digital "1" and provides a means of stopping the operation of the converter as represented by the preferred embodiment graphically depicted in FIG. 1 which is accomplished by rendering the input at the stop input terminal 15 a low or digital "0."

When the stop input signal received at terminal 15 is high and a key on the connected teletypewriter machine keyboard is depressed, the converter of FIG. 1 will receive, through the opening and closing of the relay 12, a typical teletypewriter configuration of signals which may consist of a start pulse, a series of five data pulses, and a stop pulse.

Figure 2:
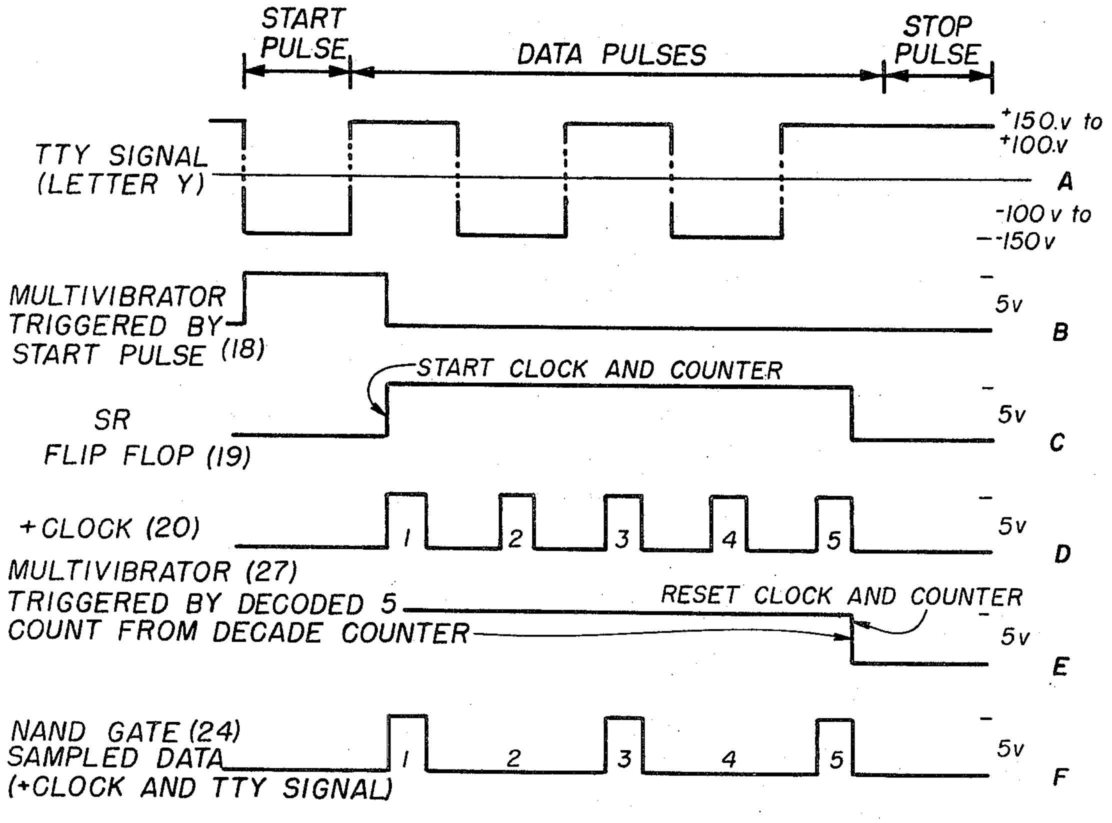
FIG. 2 is a graphical representation of signal waveforms designated A through F which are developed in the operation of the embodiment shown in FIG. 1.

Waveform A of FIG. 2 depicts a typical teletypewriter signal comprising the coded digital data information designating the letter "Y" which, when received may be in the form of signal transitions having maximum excursions of the order of 200 to 300 volts representing five data bits.

The start pulse received through the inverter 16 and the NAND gate 17 actuates the monostable multivibrator 18 to generate an output pulse. The width or duration of its output pulse of the monostable multivibrator 18 is determined by the time constant of the resistor 28 and its associated capacitor 29. Since the concept of the present invention requires that the digital output data pulses of the converter be generated only in the absence of signal transitions of the input high voltage teletypewriter signals, the width or duration of the pulse generated by the monostable multivibrator 18 is predetermined to be sufficiently long to terminate after the occurrence of the signal transition point of the first of the predetermined number of repetitive uniform data periods, such as the five uniform data periods in the typical embodiment illustrated in FIG. 1. Thus, as may be seen from waveform B of FIG. 2, the monostable multivibrator 18 terminates its pulse after the signal transition point which designates the beginning of the first of the repetitive uniform data periods depicted in waveform A.

The termination of the output pulse from monostable multivibrator 18 causes the SR flip-flop 19 to produce an output which is connected to both the clock 20 and the counter 23. The output of the SR flip-flop 19 causes the clock 20 to begin generating its uniform pulse output at the same repetitive rate as that of the incoming teletypewriter data bits.

The counter 23 is simultaneously enabled to count the outputs of the clock 20 and, in the particular embodiment illustrated in FIG. 1, the decade counter 23 is so arranged as to produce an actuating input for NAND gate 26 when its cumulative count reaches 5. As a result, when the predetermined number of repetitive uniform data periods has been reached, counter 23 actuates the NAND gate 26 which produces an output in turn actuating the monostable multivibrator 27 to change its state and produce an output that is fed to the SR flip 19. The SR flip-flop 19 then changes its state in turn, and produces an output which turns off both the clock and the counter.

The monostable multivibrator 27 maintains its reset state for a period of time which is determined by the time constant of its associated resistor 30 and capacitor 31. The time period so determined is ideally slightly less than the duration of the stop pulse as shown in waveform A of FIG. 2. When the monostable multivibrator 27 changes states, it removes the input it had previously provided to the SR flip-flop 19 and to the NAND gate 17 thus allowing the entire cycle to repeat itself at the next point in time when a teletypewriter character data series is received into the converter.

In the meantime while the described coordinated timing operations are taking place, the NAND gate 24 which receives the output of NAND gate 14 representative of the teletypewriter input data, also receives clock signals from the clock 20. When both signals are coincidently high, the NAND gate 24 produces a responsive output. Therefore, the NAND gate in effect samples the teletypewriter data bits during repetitive clock periods, producing commensurate, responsive outputs at the output terminal 25. The resultant signal output which is developed at the output terminal 25 is shown in waveform F of FIG. 2 and it may readily be appreciated that the output comprises three successive positive going data bits having an extreme amplitude of approximately 5 volts dc and representing binary "1's," which are combined with two alternate data bits of approximately ground potentials representative of binary "0's."

Referring to FIG. 2 and recounting the operation of the preferred embodiment of the present invention as represented schematically in FIG. 1, it can be seen that the teletypewriter signal as represented by the data input for the letter "Y" shown in waveform A in combination with a start pulse and a stop pulse as is characteristic of teletypewriter operation and data transmission. Waveform B illustrates the operation of monostable multivibrator 19 as it is triggered by the start pulse and develops an output pulse of its own which is longer in duration than the teletypewriter start pulse. Clearly as shown in the graphical representation of waveforms of FIG. 2, the pulse from multivibrator 18 endures beyond the first signal transition point of waveform A.

The multivibrator 18, at the end of its pulse is operative to actuate the SR flip-flop 19 which produces a signal as represented by waveform C. The condition of the SR flip-flop 19, as represented by waveform C, in turn actuates both the clock 20 and decade counter 23, the clock output pulses being represented by waveform D.

Upon the decade counter 23 reaching a count of 5 in the particular embodiment illustrated, the NAND gate 26 is responsive to produce an output signal actuating the monostable multivibrator 27 which functions to change the state of the SR flip-flop and in turn resets the clock 20 and the counter 23 as is illustrated in FIG. 2 which shows waveform E as the typical signal developed to reset the clock 20 and the counter 23.

The combination of clock sampling pulses as shown by waveform D are fed into the NAND gate 24 together with the input signals from the NAND gate 14 representative of the received teletypewriter data and produces the output signal at output terminal 25 typically in the form of waveform F as shown in FIG. 2 and as previously explained.

In accordance with the concept of the present invention peripheral or associated data processing computation or digital logic equipment may be synchronized with the operation of the converter by utilizing signals which are available in the form of a clock signal at terminal 32, a reset signal at terminal 33, and a disable signal at terminal 34. Accordingly, the operation of associated, proximate logic circuitry can be confined to those periods when teletypewriter transition signals are absent, further enhancing operation by insuring against developing false signals which would introduce error into the associated logic circuitry.

The concept of the present invention, as will be readily appreciated by those skilled and knowledgeable in the pertinent arts, is adapted to the use of integrated TTL circuitry which is presently commercially available to provide monostable multivibrators, flip-flops which collectively co-act in the manner of decade counters when appropriately connected and arranged.

Obviously many modifications and variations of the present invention are possible in the light of the above teachings. It is therefore to be understood that within the scope of the appended claims the invention may be practiced otherwise than as specifically described.

What is claimed is:

1. An apparatus for converting high voltage teletypewriter signals into low-voltage signals adapted for use in digital logic circuits, said high voltage teletypewriter signals including a start signal, data information defined by signal transitions occurring within a predetermined number of repetitive uniform data periods, and a stop signal, comprising:

means responsive to the data information contained within said high voltage teletypewriter signals for generating low voltage signals having like data information contained in signal transitions of substantially less than one-tenth of said high voltage signals;

means responsive to said start signal for producing a delayed enabling signal at a predetermined time interval of one-half of one uniform data period after the occurrence of the signal transition within the first of said uniform data periods;

a clock operative upon actuation for producing sampling pulses substantially at the repetition rate of said uniform data periods;

means connecting said delayed enabling signal for actuating said clock and generating said sampling pulses substantially at the mid-points of said uniform data periods;

means responsive to said sampling pulses for sampling the data information within said low voltage data signals producing commensurate output data information in the form of low voltage pulses for use in digital logic circuits;

counter means responsive to said enabling signals for sequentially counting said sampling pulses and producing an output signal indicative of a cumulative count equal to said predetermined number of repetitive uniform data periods; and means responsive to said output signal for stopping said clock and resetting said counter means.

2. An apparatus as claimed in claim 1 wherein said output data information pulses are of substantially shorter duration than said repetitive uniform data periods.

3. An apparatus as claimed in claim 1 wherein said clock comprises two monostable multivibrator units having mutual input-output feedback connections.

4. An apparatus as claimed in claim 1 wherein said means responsive to said output signal for stopping said clock and resetting said counter means is operative to maintain its reset condition for a period of less duration than said stop signal, restoring said apparatus to a condition for responding to subsequent additional teletypewriter signals.

* * * * *